(12) United States Patent
De Boer

(10) Patent No.: US 11,041,484 B2
(45) Date of Patent: Jun. 22, 2021

(54) METHOD FOR CONTROLLING A WIND TURBINE, AND ASSOCIATED WIND TURBINE

(71) Applicant: Wobben Properties GmbH, Aurich (DE)

(72) Inventor: Wolfgang De Boer, Moormerland (DE)

(73) Assignee: Wobben Properties GmbH, Aurich (DE)

( * ) Notice: Subject to any disclaimer, the term of this patent is extended or adjusted under 35 U.S.C. 154(b) by 104 days.

(21) Appl. No.: 16/349,816

(22) PCT Filed: Nov. 15, 2017

(86) PCT No.: PCT/EP2017/079300
§ 371 (c)(1),
(2) Date: May 14, 2019

(87) PCT Pub. No.: WO2018/091519
PCT Pub. Date: May 24, 2018

(65) Prior Publication Data
US 2019/0360469 A1     Nov. 28, 2019

(30) Foreign Application Priority Data

Nov. 15, 2016 (DE) .................. 10 2016 121 961.4

(51) Int. Cl.
| | |
|---|---|
| *F03D 17/00* | (2016.01) |
| *F03D 7/02* | (2006.01) |
| *F03D 7/04* | (2006.01) |

(52) U.S. Cl.
CPC ........... *F03D 17/00* (2016.05); *F03D 7/0224* (2013.01); *F03D 7/0204* (2013.01); *F03D 7/046* (2013.01);
(Continued)

(58) Field of Classification Search
CPC ........ F03D 17/00; F03D 13/30; F03D 7/0204; F03D 7/046; G05B 13/022; G05B 13/0225; G05B 13/025; G05B 2219/32018
See application file for complete search history.

(56) References Cited

U.S. PATENT DOCUMENTS

| | | | |
|---|---|---|---|
| 7,101,152 B2 * | 9/2006 | Wobben ................. | F03D 7/046 416/1 |
| 7,571,013 B2 * | 8/2009 | Altemark ............ | F03D 7/0224 700/34 |

(Continued)

FOREIGN PATENT DOCUMENTS

| | | | | |
|---|---|---|---|---|
| AU | 2008256003 B2 | 12/2008 | | |
| CN | 101495747 A * | 7/2009 | ............. | F03D 17/00 |

(Continued)

OTHER PUBLICATIONS

Justin Creaby, "Method to Automatically Tune a Yaw Offset for a Wind Turbine Direction Sensor on a Wind Turbine via Extremum Seeking", May 21, 2014, 2 pages.

*Primary Examiner* — Igor Kershteyn
*Assistant Examiner* — Topaz L. Elliott
(74) *Attorney, Agent, or Firm* — Seed Intellectual Property Law Group LLP

(57) ABSTRACT

A method for controlling a wind power installation, to an associated wind power installation and to a wind farm with a number of wind power installations. The method comprises: providing a wind speed and a direction of incident flow, which are determined by a wind measuring device of the wind power installation, providing a correction value of the direction of incident flow in dependence on the wind speed, carrying out a process of learning the correction value of the direction of incident flow in dependence on the wind speed. The learning process comprises a number of opti-
(Continued)

mizing steps, an execution of the optimizing steps depending on the optimizing steps that have already been carried out for the wind speed provided. Improved tracking of the wind is provided.

20 Claims, 3 Drawing Sheets

(52) U.S. Cl.
CPC ..... *F05B 2270/32* (2013.01); *F05B 2270/328* (2013.01)

(56) References Cited

U.S. PATENT DOCUMENTS

| | | | | |
|---|---|---|---|---|
| 7,952,215 | B2* | 5/2011 | Hayashi | F03D 7/0204 290/44 |
| 8,476,780 | B2* | 7/2013 | Hashimoto | F03D 7/0204 290/44 |
| 2008/0001409 | A1* | 1/2008 | Schellings | F03D 7/046 290/44 |
| 2010/0066087 | A1* | 3/2010 | Hayashi | H02P 9/00 290/44 |
| 2013/0099497 | A1* | 4/2013 | Bowyer | F03D 7/042 290/44 |
| 2013/0238244 | A1 | 9/2013 | Kang et al. | |
| 2014/0193254 | A1* | 7/2014 | Gopolan | F03D 7/043 416/1 |
| 2015/0086357 | A1* | 3/2015 | Gregg | F03D 7/046 416/1 |
| 2015/0252786 | A1* | 9/2015 | Tiwari | F03D 7/046 416/1 |
| 2017/0198680 | A1* | 7/2017 | Wu | F03D 7/028 |
| 2018/0003153 | A1 | 1/2018 | Damgaard | |
| 2018/0163697 | A1* | 6/2018 | Danielsen | F03D 7/0204 |
| 2020/0032770 | A1* | 1/2020 | Nielsen | F03D 7/0224 |
| 2020/0088171 | A1* | 3/2020 | Goldner | G01P 21/025 |
| 2020/0110373 | A1* | 4/2020 | Rotea | F03D 7/0276 |

FOREIGN PATENT DOCUMENTS

| | | | | |
|---|---|---|---|---|
| CN | 101568721 | A | 10/2009 | |
| CN | 102089516 | A | 6/2011 | |
| CN | 103308711 | A | 9/2013 | |
| DE | 19934415 | A1 | 2/2001 | |
| DE | 102009015167 | A1 | 9/2010 | |
| EP | 2154362 | A1 | 2/2010 | |
| EP | 2213873 | A1 | 8/2010 | |
| EP | 2375060 | A1 | 10/2011 | |
| EP | 2653722 | A1 | 10/2013 | |
| GB | 957977 | A * | 5/1964 | ......... G05B 13/0225 |
| RU | 2075638 | C1 | 3/1997 | |
| RU | 2468251 | C1 | 11/2012 | |
| WO | WO-2011157271 | A2 * | 12/2011 | ........... F03D 7/0292 |
| WO | 2016/119795 | A1 | 8/2016 | |

* cited by examiner

METHOD FOR CONTROLLING A WIND TURBINE, AND ASSOCIATED WIND TURBINE

BACKGROUND

Technical Field

The present invention relates to a method for controlling a wind power installation and to a wind power installation with a control module and also to a wind farm.

Description of the Related Art

It is known to control wind power installations on the basis of anemometers or similar devices that are provided for determining a wind speed and a direction of incident flow in the region of a nacelle of the wind power installation. The wind power installation, in particular an azimuthal position of the wind power installation, is controlled in such a way that a direction of incident flow of the wind recording device corresponds to an associated value for the prevailing wind speed. The aim of the control is to obtain the best possible alignment of the wind power installation on the basis of the direction of incident flow recorded, the measured direction of incident flow being corrected by a correction term that is dependent in particular on the wind speed.

Such a wind direction correction table has up until now been determined on a prototype of a wind power installation with a wind measuring mast arranged alongside, and then transferred to the rest of the series of wind power installations. Both installations are subjected to an unconstrained flow; the wind direction correction table is then determined in such a way that the wind power installation is right in the wind.

In the case of the wind power installation in the wind farm, fitting inaccuracies occur, in particular during the fitting of the wind measuring device, which may for example be skewed by a few degrees when it is fitted on the nacelle. This misalignment of the wind measuring device is transferred directly to the control for tracking the direction of the wind, and must consequently be determined individually for each installation and corresponding correction values must be manually recorded and updated.

In addition, in particular due to the design of the rotor blades with for example trailing edge segments, there is a difference in the direction of incident flow between the nacelle and the anemometer, which likewise has to be corrected.

Due to the manual determination of the errors of the wind direction correction table for each installation, fitting and maintenance involve a great amount of effort and there is a significant susceptibility to incorrect determinations.

BRIEF SUMMARY

Provided is a method for controlling a wind power installation and also an associated wind power installation that make improved tracking of the wind possible.

A method for controlling a wind power installation is provided. The method comprises providing a wind speed and a direction of incident flow, which are determined by a wind measuring device of the wind power installation, providing a correction value of the direction of incident flow in dependence on the wind speed and carrying out a process for learning the correction value of the direction of incident flow in dependence on the wind speed. The learning process comprises a number of optimizing steps, an execution of the optimizing steps depending on the optimizing steps that have already been carried out for the wind speed provided.

The correction value of the direction of incident flow or the direction of incident flow corrected by the correction value is preferably used for the azimuthal movement and control of a tower of the wind power installation. It is ensured by the correction value of the direction of incident flow that, in dependence on the wind speed, the wind power installation is optimally in the wind at all times. In the practical implementation of the control, the further boundary conditions, such as for example wear of the azimuth tracking, must of course also be taken into consideration.

The method is consequently suitable for learning the wind direction correction tables of the individual wind power installation little by little by means of the learning process, without determination of correction values being required. Since the learning process or the execution of the optimizing steps depends on the optimizing steps already carried out for the wind speed provided, it is also made possible that the method determines an initial correction value and, after a definable learning phase during which the correction value or values of the wind power installation settle down, is suitable for permanently operating the wind power installation.

In one embodiment, the correction value would be determined for a specific working point of the wind power installation. In one embodiment, the correction value of the direction of incident flow is consequently provided in dependence on a working point of the wind power installation. It can then be established for a specific working point how many optimizing steps of the learning process have already been carried out. In dependence on how many optimizing steps have already been carried out for the specific working point, an execution of further optimizing steps then takes place.

In one embodiment, the time period between two optimizing steps carried out for a wind speed increases with the number of optimizing steps executed. At the beginning of the learning process, no data or only very few data are available for a wind speed or preferably for a specific working point. The more data are available, the more accurate the correction value for a specific wind speed or a specific working point is. It is correspondingly sufficient to make the frequency of the optimizing steps executed decrease with a number of optimizing steps already executed. Each optimizing step preferably comprises an azimuth adjustment of the wind power installation that is accompanied by a drop in power. It is also desirable, as already mentioned, to keep the frequency of the azimuth adjustment at an acceptable level. For example, during the running-in phase, it may be that the optimizing steps are carried out every few minutes. Once the installation has run in, the frequency may be reduced, for example to carrying them out hourly. Carrying out the optimizing steps hourly is unobtrusive within the process of executing the wind tracking that is carried out in any case, and can be carried out without increased wear throughout the entire lifetime of the wind power installation. By just reducing the frequency, without ending the process altogether, a change that occurs at a later point in time can also be taken into consideration and the wind power installation can always be operated with the optimum correction of the wind tracking.

In one embodiment, the correction value corrects the measured direction of incident flow for controlling the azimuthal position of the wind power installation. In one embodiment, each optimizing step comprises varying the azimuth angle in first one direction and then the other. A variation of the azimuth angle preferably corresponds to a turning of the nacelle, for example to the left and right. In one embodiment, the wind power installation is for example first corrected by 5° to the left and then by 5° to the right. It goes without saying that the variation first to the left and then to the right and also the 5° stated by way of example are to be understood as a preferred embodiment, a person skilled in the art also taking into consideration other sequences and magnitudes of the variation.

Preferably, both after variation in one direction and after variation in the other direction, an optimization parameter is compared and a proposal for the amendment of the correction value is provided until the changing of the optimizing parameter is symmetrical with the variation. In one embodiment, the optimizing parameter is a drop to a low power level, so that a comparison is made of the changing of the power when there is a variation in one direction and the other direction. In another embodiment, in particular when the wind power installation is operated at rated power, a variation of the correction value does not result in a drop to a low power level. In this embodiment, the correction angle that is closer to the optimum may be the value at which the installation can still generate the rated power with a higher blade angle.

In one embodiment, each optimizing step also comprises: determining the respective drop in power of the wind power installation after the varying of the azimuth angle in one direction and the other direction, evaluating both drops in power and determining the direction of the variation with the smallest drop in power. Optionally, each optimizing step also comprises providing an amendment of the correction value in the direction of the smaller drop in power. Changes of the power, i.e., power gradients, in the direction of an optimum are shallower, i.e., power losses are less severe. At the optimum, the gradients are equal for turns in one direction and the other direction, i.e., a then recurring execution of the optimizing step no longer has the consequence of providing an amended correction value.

In one embodiment, whenever the wind power installation generates rated power and no drop in power occurs during the variation of the azimuth angle in one direction and the other direction, each optimizing step also comprises: increasing a blade angle of the rotor blades, establishing a maximum blade angle for which the wind power installation can generate rated power, and optionally providing an amendment of the correction value in the direction for which the wind power installation can generate the rated power with the higher blade angle. To put it another way, determining the maximum blade angle with which the rated power is achievable allows the tracking of the wind to be optimized even at rated power.

In one embodiment, an optimizing step of the learning process is only carried out whenever a turbulence criterion goes below a threshold value. It can be ensured by the turbulence criterion that an improvement possibly established by the optimizing step is not achieved in response to a change in the wind conditions prevailing at the time, but by the improvement of the correction value. Gusty or turbulent wind is not suitable for this.

In one embodiment, the turbulence criterion comprises a difference between a momentary value and a one-minute mean value of the power. Other embodiments of the tolerance criterion can be easily implemented by a person skilled in the art; for example, the turbulence criterion may comprise a difference between a minute mean value and a ten-minute mean value of the power and/or of the wind speed. If the power and/or the wind speed of the last minute and the last ten minutes do not differ significantly, it can be assumed that the wind is not very gusty. In another in one embodiment, an optimizing step of the learning process is only carried out whenever a variation of the wind direction goes below a threshold value. This ensures that the learning process is only applied if the wind direction is not frequently varying just then, that is to say the installation does not carry out a great number of alignments for tracking the wind or even establish an oblique incident flow.

In one embodiment, the wind speed is determined before the beginning or after the completion of an optimizing step. A wind speed measurement may in particular be influenced by an oblique incident flow of the wind power installation. During an optimizing step there is a brief oblique incident flow, which falsifies the determined wind speed asymmetrically during the optimizing step. Determining the wind speed before the beginning or after completion prevents for example an asymmetry from occurring in the characteristic diagrams of the correction values, which would for example favor one turning direction about the azimuthal position.

In one embodiment, the method also comprises providing a nacelle position, the correction value being provided in dependence on the nacelle position and the learning process being carried out in dependence on the nacelle position. By providing the nacelle position in addition to the direction of incident flow, the correction value can take into consideration farm effects, for example wake effects. The method consequently also allows an optimization of the various installations within a farm for different wind directions to be achieved without any manual effort. To put it another way, the nacelle position is indicative of the direction from which the wind is coming.

In one embodiment, the correction value is provided on the basis of a characteristic diagram. The use of characteristic diagrams is widespread. Different dimensionalities of characteristic diagrams can be used for the method. As mentioned here, in particular in dependence on the wind speed, the working point and/or the nacelle position should be understood as given by way of example; other dependences of the characteristic diagrams are also conceivable.

Preferably, the characteristic diagram is tabulated in dependence on the wind speed and operating characteristic curve and/or the wind speed and rotational speed of the wind power installation. In other embodiments, however, as mentioned, the characteristic diagram may also include other dependences, for example the tip speed ratio of the wind power installation or others.

In one embodiment, neighboring characteristic diagram cells are smoothed. For example, the quantization of the characteristic diagram cells of the learning process may differ from the quantization of automatically generated or preset characteristic diagrams. In particular, a coarser quantization may be used for the learning process, in order to keep the number of correction values of the characteristic diagram to be optimized within manageable limits. In order to ensure that discontinuities are not manifested as abrupt wind tracking alignments, mutually adjacent characteristic diagram cells can preferably be made to match up with one another.

In one embodiment, the optimizing step provides an amendment, in particular an improvement, of the correction value.

In one embodiment, the amendment of the correction value is a constant amount, for example 0.1° or 0.01° in the case of an azimuthal position. In other embodiments, the amendment of the correction value may also depend on the previous learning process; for example, the amendment may be all the more minor the more optimizing steps have already taken place for a specific working point or a specific wind speed. In a further embodiment, for the determination of the correction value, the power loss described above may be scaled while carrying out the optimizing step. To put it another way, a greater power loss may bring about a greater amendment of the correction, since it can be assumed that the correction value is even further away from the optimum.

In one embodiment, a constant amendment of the correction value of one tenth of a degree or one hundredth of a degree is provided. In other embodiments, other constant correction values are conceivable.

In one embodiment, an amendment of the correction value in dependence on the drop in power is provided. Preferably, the correction is limited to a specific amplitude. In this way, the effects of measurement outliers can be restricted. For example, the correction can be restricted to 0.2°, while other values may also be suitable as limits. In a further aspect of the invention, a wind power installation with a control module and a wind measuring device is provided. The wind measuring device is designed to provide a wind speed and a direction of incident flow. The control module is designed to provide a correction value of the direction of incident flow in dependence on the wind speed and to carry out a learning process of the correction value of the direction of incident flow in dependence on the wind speed. The learning process comprises a number of optimizing steps, an execution of the optimizing steps depending on the optimizing steps that have already been carried out for the wind speed provided.

The wind power installation makes it possible to achieve the same advantages as are achieved by the method. The wind power installation may also exhibit all of the special refinements of the method and be combined with all of the advantageous aspects.

Similarly, the invention relates to a wind farm with a number of wind power installations.

BRIEF DESCRIPTION OF THE SEVERAL VIEWS OF THE DRAWINGS

Further advantageous refinements of the invention are evident below with reference to the accompanying figures, in which.

DETAILED DESCRIPTION

Identical designations may be used below to denote elements that are similar but not identical. Furthermore, the same elements may be represented on different scales.

Figure 1:
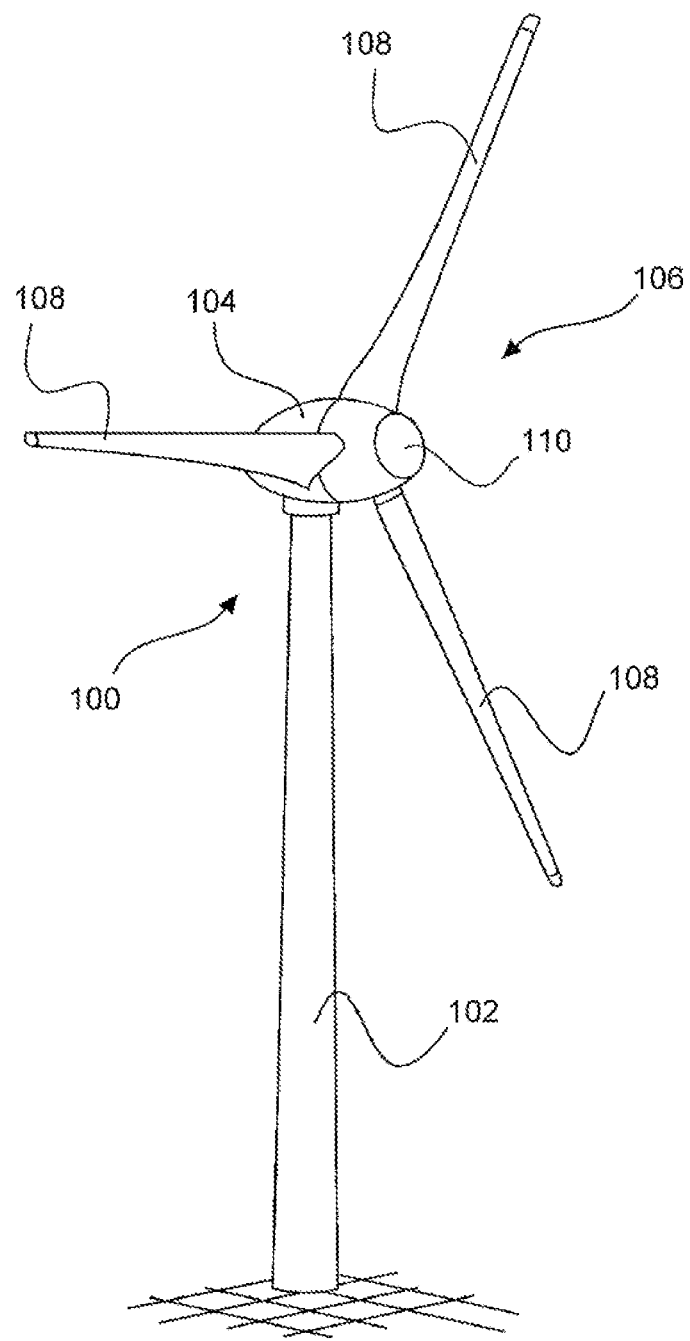
FIG. 1 shows a schematic view of a wind power installation.

FIG. 1 shows a wind power installation 100 with a tower 102 and a nacelle 104. Arranged on the nacelle 104 is a rotor 106 with three rotor blades 108 and a spinner 110. The rotor 106 is set in a rotary motion by the wind, and thereby drives a generator in the nacelle 104.

Figure 2:
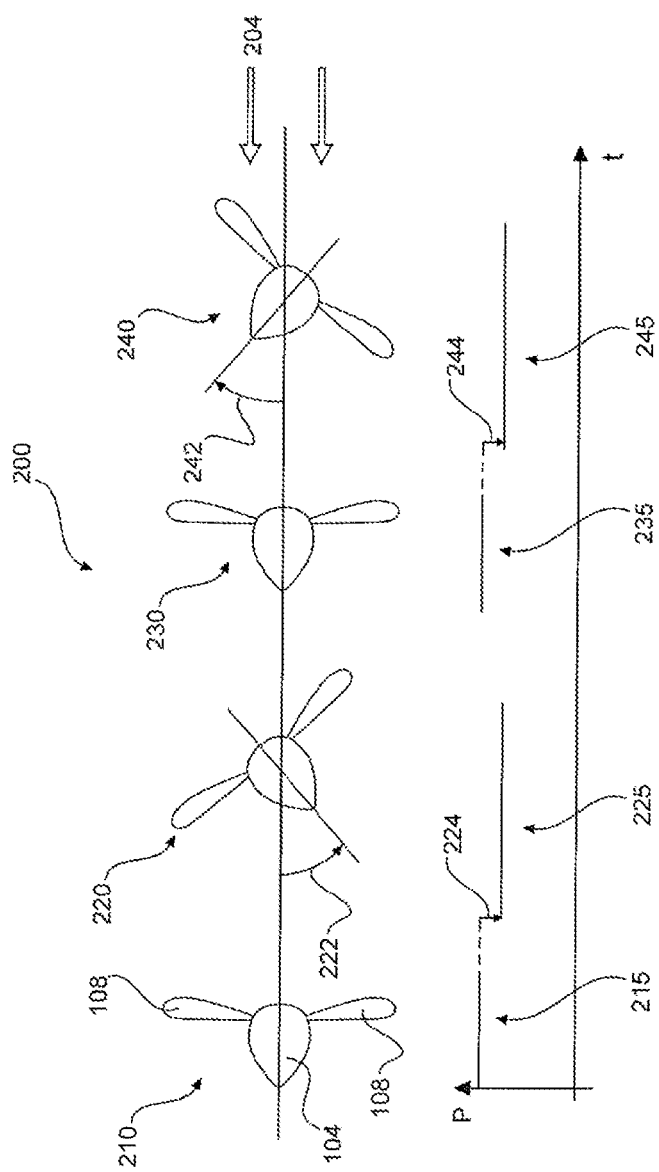
FIG. 2 shows by way of example the carrying out of the learning process of the method according to the invention.

FIG. 2 shows by way of example the carrying out of an optimizing step 200 of a learning process, which is used in the method for controlling a wind power installation. In the upper part of FIG. 2, four nacelles 104 of a wind power installation, each with two rotor blades 108, are shown in a plan view. The time t is plotted horizontally, i.e., the four nacelles 104 correspond to the wind power installation at different, successive times.

In a step 210, the wind power installation is first aligned in the direction of the wind 204. During this time, the wind power installation generates a power P, which is denoted by 215. In the lower part of FIG. 2, the time t is plotted horizontally against the power P achieved. At the beginning of the optimizing step, the wind power installation is turned in step 220 by an angle 222 in the azimuthal direction. The angle 222 is in this example indicated as to the left, out of the wind 204; in other exemplary embodiments, however, it may correspond to the other direction. While in this position, the wind power installation generates a power P, which is indicated by 225 and is lower by a value 224 than the power 215 which was achieved when the wind power installation was in the wind.

After the turning to the left in step 220, in step 230 the wind power installation is turned into the wind again. The power 235 achieved corresponds to the previously achieved power 215. If the power 235 differs from the power 215, this is an indication of a gustiness of the wind, which leads to the learning process or the optimizing step 200 being suspended.

Subsequently, in step 240, the wind power installation is turned to the right in the example by an adjusting angle 242. The difference 244 between a power 245 during the azimuthal position in step 240 and the power 235 during step 230 is compared with the difference in power 224. If the value 224 is different from the value 244, this is an indication that the wind direction correction carried out by the wind power installation is not optimal and an improved control value or a correction factor for the control value is obtained by the learning process. In this exemplary embodiment, the learning process 200 may be understood as a Maximum Power Point Tracking (MPPT) of the azimuth angle. In the case shown in FIG. 2, the MPPT process will have the consequence that, at the working point at which the wind power installation is operated in steps 210 to 240, the wind direction correction has to be moved further to the left, since the turning to the left results in a smaller drop to a lower power level than the turning to the right.

Figure 3:
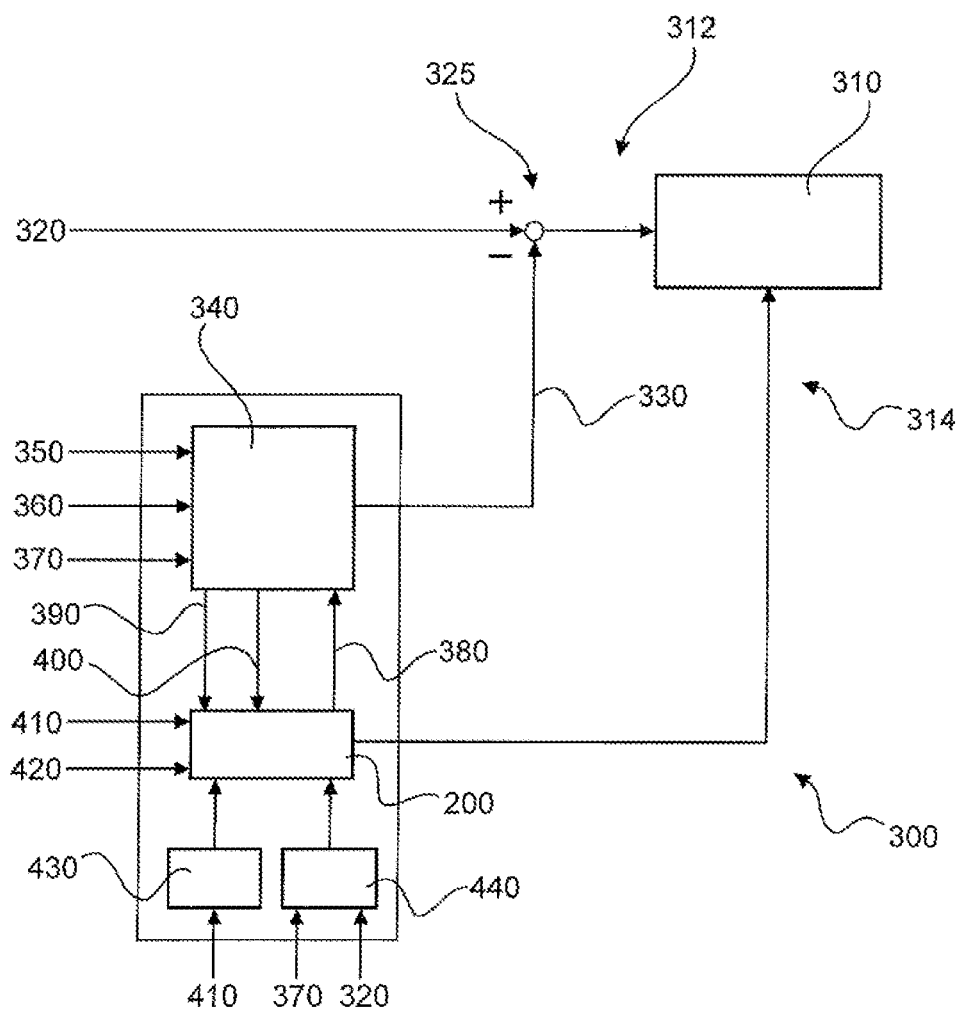
FIG. 3 shows a schematic structural diagram of the method according to the invention.

FIG. 3 shows a structural diagram by way of example of a method 300 for controlling a wind power installation. The central element of the method 300 is the wind tracking system 310, which ensures a closed-loop control of the wind power installation for tracking to the wind. This unit is also known as a yaw unit.

In a control mode, the wind direction tracking system 310 is supplied by way of an input 312 with a wind direction measurement 320, which has been corrected in a step 325 by a wind direction correction angle 330. Suitable as the control value of the direction of incident flow are both the wind direction correction angle 330 and the generated difference, as it is shown in the example, the wind direction tracking system 310 being adapted correspondingly. The wind direction measurement 320 is preferably performed on the basis of an anemometer, which is fitted on the nacelle 104 of the wind power installation 100.

The wind direction correction angle 330 is determined from a correction characteristic diagram 340, the correction characteristic diagram 340 having as an input variable a wind speed 350 and optionally in addition a tip speed ratio, rotational speed or power characteristic curve 360 and a nacelle position 370, which corresponds to the direction from which the wind is coming. The correction characteristic diagram 340 correspondingly has one or more dimensions.

The input variables 350 and optionally 360 and/or 370 are used in order to obtain the wind direction correction angle 330 by means of the correction characteristic diagram 340 to correct the wind direction measurement 320.

The MPPT process 200 shown in the form of a detail in FIG. 2 provides by way of a step 380 a correction of the correction characteristic diagram 340 if the method detects a need for optimization.

The MPPT process 200 is fed an index 390 and a correction counter 400. The index 390 indicates the value of the correction characteristic diagram 340, which is obtained from the input parameters 350 and optionally 360 or 370. The correction counter 400 indicates a value for how often the characteristic diagram value at the index 390 has already passed through the MPPT process 200 and possibly been corrected. Preferably, the time interval between two successive learning steps of the MPPT process 200 is dependent on the correction counter 400 and increases with increasing correction counter value 400. As already described in FIG. 2, the MPPT process 200 requires as a further input variable a power value 410 and optionally a blade angle 420. The blade angle 420 is used whenever the MPPT process 200 establishes that there is no drop in power when there is a turning of the nacelle in steps 220 and 240, that is to say whenever the wind power installation is being operated at rated power. Such a wind direction correction angle 330 is closer to the optimum at which the wind power installation 100 can still generate the rated power with a higher blade angle.

The MPPT process 200 is paused if a gustiness detection 430 establishes a gustiness of the wind. For this, the gustiness detection 430 records the power 410 and determines for example a difference between the momentary power and the one-minute mean-value power of the previous minute. If this difference in the power outputs exceeds a certain threshold value, there is a gusty wind, which would easily falsify the learning process. In particular, when there is a gusty wind, the wind speed will change more quickly than the nacelle 104 can turn by a sufficient amount about the azimuth axis.

There is also an oblique incident-flow detection unit 440, which likewise leads to a suspension of the MPPT process 200 if the oblique incident-flow detection unit 440 detects by means of the entered nacelle position 370 and the wind direction measurement 320 that the wind direction is frequently varying just then; consequently, the wind power installation 100 in any case carries out a number of alignments for tracking the wind, or even an oblique incident flow is established.

To form the correction steps, optimizing steps, which can also be referred to as learning steps, are passed to the wind direction tracking system 300 by way of a second input 314. The corresponding adjusting angle profiles are shown for example in steps 210 to 240 of FIG. 2.

Preferably, in each optimizing step, the azimuth angle is adjusted by a constant adjusting angle, for example 5°. The adjustment is performed alternately in each direction with respect to the alignment of the installation respectively assumed until then as ideal. In other exemplary embodiments, adjusting angles by which the installation is adjusted that are dependent on the number of the correction counter 400 or on other parameters are also conceivable.

In this exemplary embodiment, the intensity of the correction step 380 is proportional to the detected difference in power, that is to say the difference between power 240 and 224. Alternatively, the absolute difference in power 224 or 244 may be used for scaling the correction step. The underlying idea here is that power gradients in the direction of an optimum are shallower, that is to say power losses are less severe, the closer the correction is to the optimum. At the optimum, the gradients for turns to the left and right are equal, that is to say a then recurring execution of the MPPT process 200 no longer results in any change. In other exemplary embodiments, the correction step 380 may also be predetermined and constant.

In particular if rotor blades 108 that have a trailing edge segment are used, the intensity of the wind deflection is dependent on the torque that is taken from the wind. The torque can be expressed by the tip speed ratio, that is to say the ratio of the circumferential speed to the wind speed. As an alternative to tabulating the correction characteristic diagram 340 on the basis of the wind speed 350, consequently a tabulation that is dependent on the tip speed ratio may also be provided. Since the wind speed 350 does not contain any information about the torque, preferably a second dimension is added to the correction characteristic diagram 340. Preferably, the correction characteristic diagram 340 is consequently generated additionally in dependence on the chosen power characteristic curve as an input 360. As an alternative to tabulation on the basis of wind speed 350 and an operating characteristic curve, a tabulation of the correction characteristic diagram 340 on the basis of wind speed 350 and tip speed ratio or rotational speed 360 is also possible. The additional dimension on the basis of the nacelle position 370 makes it possible to integrate absolute wind directions for the correction characteristic diagram 340, and consequently to make possible direction-dependent wind direction corrections which for example take farm effects into consideration.

The wind speed measurement is influenced by an oblique incident flow of the wind power installation 100, since the wind can blow through the rotor 108 better when there is an oblique incident flow from one direction than when there is an oblique incident flow from the opposite direction. The oblique incident flow occurring for a short time in each case during the optimizing steps to the left and right falsifies the wind direction measurement asymmetrically during the carrying out of the optimizing step. In order to avoid an asymmetry in the characteristic diagram 340 with which one turning direction would be favored, the wind speed measurement must not be evaluated during the optimizing step. The wind speed must be measured before or after the optimizing step, and the associated index 390 in the characteristic diagram 340 selected.

Discontinuities may occur in the automatically created characteristic diagrams 340. These discontinuities can be explained for example by attachments on the nacelle 104, which have a falsifying effect on the wind direction measurement. It is actually desired also to record these discontinuities in the correction characteristic diagrams 340. However, on account of coarse quantization, this is not possible to perfection. In order that these discontinuities in the characteristic diagrams 340 do not lead to abrupt wind tracking alignments by the wind direction tracking 310, a smoothing algorithm that makes the neighboring cells of the correction characteristic diagram 340 match up with one another is preferably used.

The invention claimed is:

1. A method for controlling a wind power installation, comprising:
   measuring a wind speed and a direction of incident flow using a wind measuring device of the wind power installation; and
   determining a correction value of the direction of incident flow in dependence on the wind speed,
   wherein determining the correction value includes carrying out a process of learning the correction value of the direction of incident flow in dependence on the wind speed, wherein the process of learning comprises a plurality of iterative optimizing steps, wherein an execution of each of the iterative optimizing steps depends on at least one prior optimizing step that has already been carried out for the wind speed provided,
   wherein a time period between two optimizing steps of the plurality of iterative optimizing steps carried out for the wind speed increases with a number of optimizing steps executed.

2. The method as claimed in claim 1, wherein the correction value of the direction of incident flow is determined in dependence on a working point of the wind power installation.

3. The method as claimed in claim 1, wherein the correction value corrects the measured direction of incident flow for controlling an azimuthal position of the wind power installation.

4. The method as claimed in claim 1, wherein each optimizing step of the plurality of iterative optimizing steps comprises varying an azimuth angle of the wind power installation in a first direction to a first azimuth angle and in a second direction to a second azimuth angle, wherein the first and second azimuth angles are symmetrically arranged relative to each other about the measured direction of incident flow.

5. The method as claimed in claim 4, wherein each optimizing step comprises:
   determining respective drops in power of the wind power installation after varying the azimuth angle in the first direction and the second direction, and
   evaluating the drops in power and determining the direction of the variation associated with a smaller drop in power.

6. The method as claimed in claim 5, wherein, whenever the wind power installation generates rated power and no drop in power occurs during the variation of the azimuth angle in the first direction and the second direction, each subsequent optimizing step comprises:
   increasing a blade angle of rotor blades;
   establishing a maximum blade angle for which the wind power installation generates the rated power; and
   providing an amendment of the correction value in the direction for which the wind power installation generates the rated power with the higher blade angle.

7. The method as claimed in claim 5, further comprising amending the correction value in the direction of the smaller drop in power.

8. The method as claimed in claim 1, wherein the iterative optimizing steps of the learning process are only carried out when a turbulence criterion is below a threshold value.

9. The method as claimed in claim 8, wherein the turbulence criterion comprises a difference between a momentary value and a one-minute mean value of power generated by the wind power installation.

10. The method as claimed in claim 1, wherein the iterative optimizing steps of the learning process are only carried out when a variation of the wind direction is below a threshold value.

11. The method as claimed in claim 1, further comprising measuring the wind speed before or after each optimizing step of the plurality of iterative optimizing steps.

12. The method as claimed in claim 1, further comprising:
   determining a nacelle position, the correction value being provided in dependence on the nacelle position and the learning process being carried out in dependence on the nacelle position.

13. The method as claimed in claim 1, wherein the correction value is determined based on a characteristic diagram.

14. The method as claimed in claim 13, wherein the characteristic diagram is tabulated in dependence on:
   the wind speed and operating characteristic curve, or
   the wind speed and rotational speed of the wind power installation.

15. The method as claimed in claim 13, wherein neighboring characteristic diagram cells are smoothed.

16. The method as claimed in claim 1, wherein the plurality of iterative optimizing steps includes an improvement to the correction value.

17. The method as claimed in claim 16, wherein each optimizing step of the plurality of iterative optimizing steps provides a constant amendment or an amendment scaled in dependence on a drop in power.

18. A wind power installation comprising:
   a tower;
   a nacelle mounted to the tower;
   a controller; and
   a wind measuring device,
   wherein the wind measuring device is designed to measure a wind speed and a direction of incident flow,
   wherein the controller is configured to determine a correction value of the direction of incident flow in dependence on the wind speed and to carry out a learning process of the correction value of the direction of incident flow in dependence on the wind speed, and
   wherein the learning process comprises a plurality of iterative optimizing steps, an execution of the iterative optimizing steps depending on prior optimizing steps that have already been carried out,
   wherein a time period between two optimizing steps of the plurality of iterative optimizing steps carried out for the wind speed increases with a number of optimizing steps executed.

19. A wind farm with a plurality of wind power installations as claimed in claim 18.

20. A method for controlling a wind power installation, comprising:
   measuring a wind speed and a direction of incident flow using a wind measuring device of the wind power installation; and
   determining a correction value of the direction of incident flow in dependence on the wind speed,
   wherein determining the correction value includes carrying out a process of learning the correction value of the direction of incident flow in dependence on the wind speed, wherein the learning process comprises a plurality of iterative optimizing steps, wherein an execution of each of the iterative optimizing steps depends on at least one prior optimizing step that has already been carried out for the wind speed provided, wherein each optimizing step of the plurality of iterative optimizing steps comprises varying an azimuth angle of the wind power installation in a first direction to a first azimuth angle and in a second direction to a second azimuth angle, wherein the first and second azimuth angles are symmetrically arranged relative to each other about the measured direction of incident flow, wherein each optimizing step comprises:
  determining respective drops in power of the wind power installation after varying the azimuth angle in the first direction and the second direction, and
  evaluating the drops in power and determining the direction of the variation associated with a smaller drop in power, wherein, whenever the wind power installation generates rated power and no drop in power occurs during the variation of the azimuth angle in the first direction and the second direction, each subsequent optimizing step comprises:
  increasing a blade angle of rotor blades;
  establishing a maximum blade angle for which the wind power installation generates the rated power; and
  providing an amendment of the correction value in the direction for which the wind power installation generates the rated power with the higher blade angle.

\* \* \* \* \*